United States Patent [19]

Shelstad

[11] 4,269,614
[45] May 26, 1981

[54] APPARATUS FOR CONTROLLING THE DISPERSION OF COAL FINES INTO THE ATMOSPHERE

[75] Inventor: Keith L. Shelstad, Gillette, Wyo.

[73] Assignee: Sunoco Energy Development Co., Dallas, Tex.

[21] Appl. No.: 115,573

[22] Filed: Jan. 25, 1980

[51] Int. Cl.³ .......................................... B01D 46/42
[52] U.S. Cl. .................................. 55/385 R; 55/430; 141/44; 141/102
[58] Field of Search .......................... 141/44, 93, 102; 241/79; 55/338, 340, 430, 431, 385 R; 406/171, 173, 181, 182, 194; 34/57 A, 102

[56] References Cited

U.S. PATENT DOCUMENTS

| | | | |
|---|---|---|---|
| 2,280,240 | 4/1942 | Kathe | 55/430 |
| 3,780,495 | 12/1973 | Johanningmeier | 55/430 |

*Primary Examiner*—David L. Lacey

*Attorney, Agent, or Firm*—J. Edward Hess; Donald R. Johnson; James H. Phillips

[57] ABSTRACT

In order to limit the dispersion into the air of fines during the processing, handling and transport of fines-containing material, a hollow plow-like member is employed to insert the fines onto a conveyor belt well below larger particulate matter being conveyed by the belt. The plow-like member has a generally narrow V-shaped cross section, and the sidewalls flare outwardly at its lower terminus. The plow-like member is positioned just above the belt surface and is oriented with its leading edge facing the direction of material flow. Thus, the larger particulate matter lumps are lifted and folded back from each side of the plow-like member's centerline to define a space into which fines can be inserted through the tool interior. After the larger particulate matter lumps pass the member trailing edge, they fall back toward the belt center and cover the deposited fines.

2 Claims, 7 Drawing Figures

4,269,614

APPARATUS FOR CONTROLLING THE DISPERSION OF COAL FINES INTO THE ATMOSPHERE

BACKGROUND OF THE INVENTION

The control of airborne fines in such environments as coal and grain processing plants remains a difficult problem with satisfactory control of such airborne fines in an economic manner having been essentially heretofore unattained. Such airborne fines are dangerous in that they create a decidedly explosive atmosphere. They constitute a long range health hazard to the workers who must breathe the fines-laden atmosphere, and their deposit on virtually every surface throughout a processing plant creates a cleanliness problem which, in addition to the readily apparent aesthetic drawbacks, further constitutes secondary health and safety considerations. Further, in some environments, such as in coal processing plants, the fines (e.g., coal dust) have an intrinsic value which has been heretofore uneconomical to recover because of the difficulty in collecting, containing, and handling the fines.

It will therefore be readily apparent that it would be highly desirable to provide economical and reliable means to collect, contain and transport processing plant fines in order to create a clean, safe operating environment and to recover such intrinsic value as may be found in particular fines.

OBJECTS OF THE INVENTION

It is therefore a broad object of my invention to provide means for collecting, controlling, and transporting airborne fines.

It is another object of my invention to provide such means which are simple and economical to fabricate and install and which are completely reliable in operation.

In a more specific aspect, it is an object of my invention to provide means for controlling airborne fines in a system which includes conveyor-belt-conveyed particulate material by collecting the fines and inserting them beneath the particulate matter on the moving conveyor belt through a hollow plow-like member.

BRIEF SUMMARY OF THE INVENTION

Briefly, these and other objects of the invention are achieved by providing a vertically suspended, hollow plow-like member having a narrow V-shaped cross section, which plow-like member has a lower terminus just clearing the upper surface of a conveyor belt containing lumps of particulate matter. The plow-like member has, at its lower end, a forwardly directed point trailing outwardly to flared edges which slightly lift and temporarily divert the particulate matter travelling on the conveyor belt such that collected fines introduced into the hollow interior of the plow-like member are discharged, at the lower terminus thereof, onto the conveyor belt in the region cleared by the leading and flared edges. Immediately aft of the plow-like member, the fines are covered by the particulate matter as the particulate matter stream folds back to its former position.

DESCRIPTION OF THE DRAWINGS

The subject matter of the invention is particularly pointed out and claimed in the concluding portion of the specification. The invention, however, both as to organization and method of operation, may best be understood by reference to the following detailed description taken with reference to the accompanying drawing of which:

DETAILED DESCRIPTION OF THE INVENTION

Figure 1:
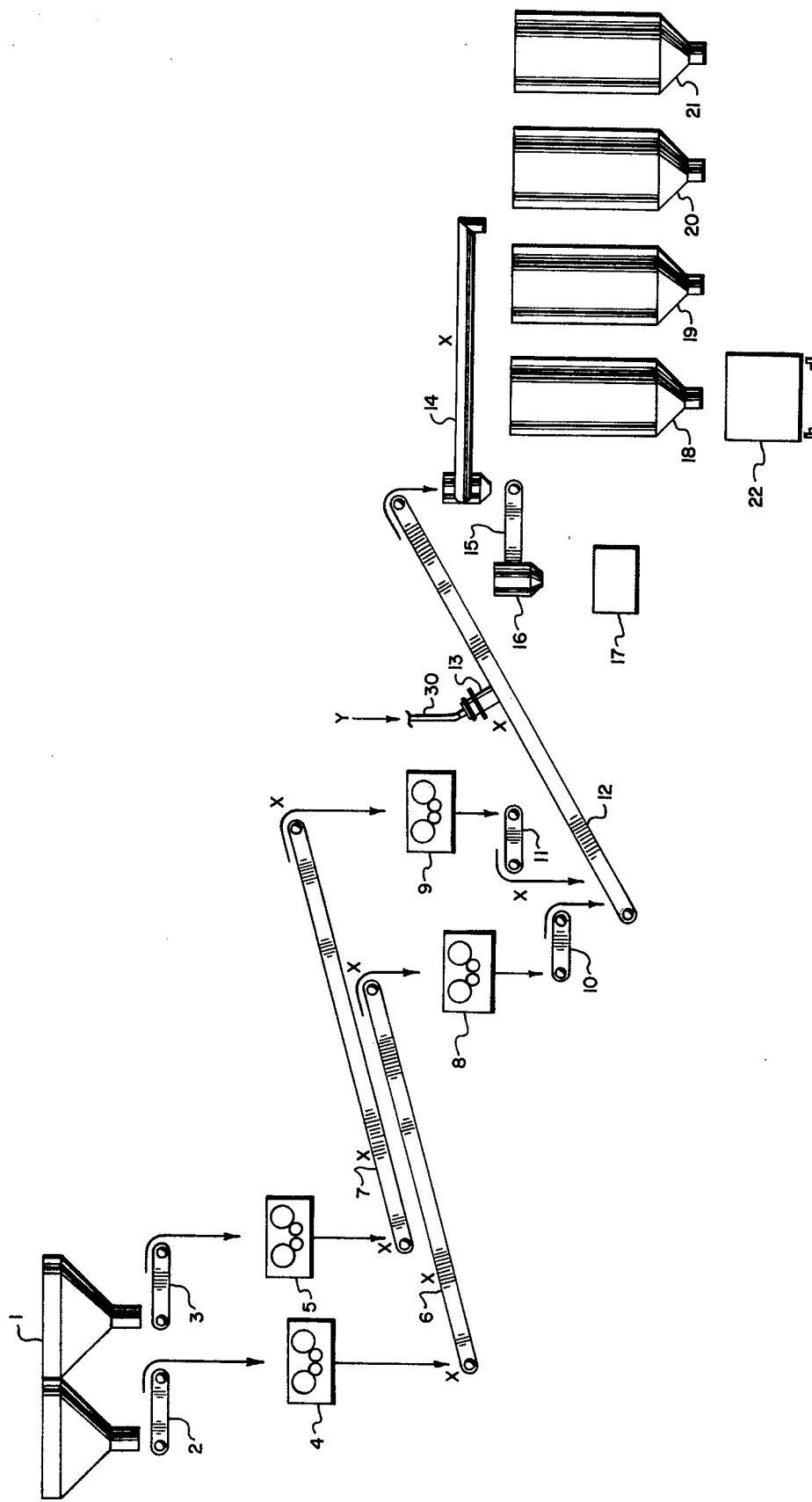
FIG. 1 is a simplified schematic diagram of an examplary environment (a coal handling and processing installation) in which the invention finds particular use.

Referring now to FIG. 1, a truck dump hopper 1 receives large, irregular lumps of mined coal from very large transport trucks (not shown) which shuttle between a nearby mine and the hopper. The size of the mined lumps may range up to four feet. The mined coal is withdrawn from two discharge chutes at the bottom of the truck dump hopper 1 onto a pair of apron feeders 2,3 in order to split the stream into two substantially identical sections for the purpose of maintaining the desired processing rate. The lump coal is conveyed, on apron feeders 2,3, for discharge into primary crushers 4,5 which serve to reduce the size of the largest lumps. The primary crushers 4,5 discharge, respectively, onto secondary feed conveyor belts 6,7 which transfer the relatively large coal lumps to secondary crushers 8,9. The secondary coal crushers serve to further reduce the largest coal lumps to on the order of eight inches. The secondary crushers 8,9 discharge, respectively, onto secondary discharge belts 10,11 which, in turn, both discharge onto a silo feed belt 12.

Figure 2:
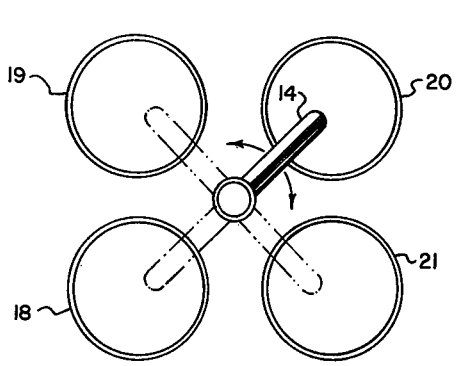
FIG. 2 is a top plan view indicating the position of an array of storage silos in such a coal processing plant.

The sized coal is carried upwardly by the silo feed belt 12 for discharge onto a rotating conveyor belt 14 which discharges the coal sequentially into silos 18, 19, 20, and 21. In practice, the silos 18–21 are nested, as shown in FIG. 2, such that the rotating conveyor belt 14 may be pivoted as shown to sequentially feed the silos. A sampling system 15,16 obtains periodic small samples of the coal being loaded into the silo. The samples are transferred to a sample pail 17 to provide means for subsequent analysis to determine BTU content and other characteristics of the coal. In accordance with normal practice, trains comprising many cars such as the gondola car 22 are passed under the silos for loading and transport to market.

According to the present invention, very high volume vacuum units are placed strategically about the plant, particularly at the coal transfer points identified by the mark "x" in FIG. 1, to collect fine coal dust. This fine coal dust is subsequently transferred to a hollow plow-like member 13 which is connected to a conduit 30 affixed to its upper end to receive the collected coal fines in a stream "y". As will be discussed more particularly below, the lower terminus of the plow-like member 13 is positioned just above the moving surface of the silo feed belt 12 and serves to fold back the coal stream and deposit the accumulated coal fines onto the belt such that the coal lumps fold back over the deposited fines and thus contain them in the coal stream passing to the silos.

Figure 3:
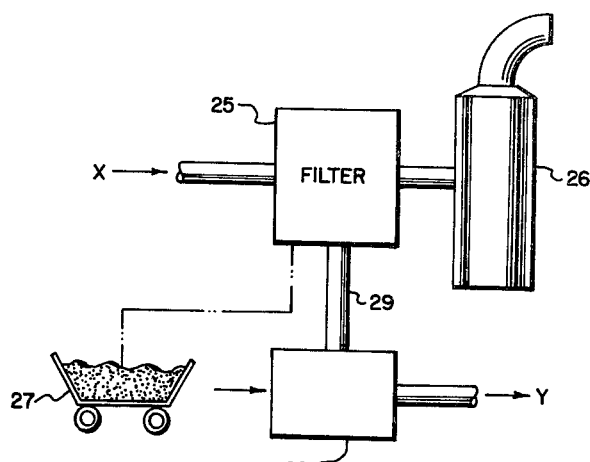
FIG. 3 illustrates typical apparatus for collecting fines in such an installation.

The means by which coal fines are collected for subsequent deposit, by the plow-like member 13, into the coal lump stream may take diverse forms. For example, as shown in FIG. 3, a very powerful vacuum unit 26 pulls fines from the positions "x" (typically terminating in very large hoods) through a filter 25 which may be a "baghouse" in which numerous filter bags hang and function somewhat in the manner of a conventional home vacuum cleaner. The accumulated coal dust may be transferred (e.g., by an auger in the bottom of the baghouse) to a small hopper car 27 for transfer to a blower 28 or may be transferred directly to the blower by an auger 29 or the like. The blower discharges pressurized coal fines stream "y" to the plowlike member 13 for discharge onto the silo feed belt 12 and containment by the larger lumps of coal as previously discussed.

Figure 4:
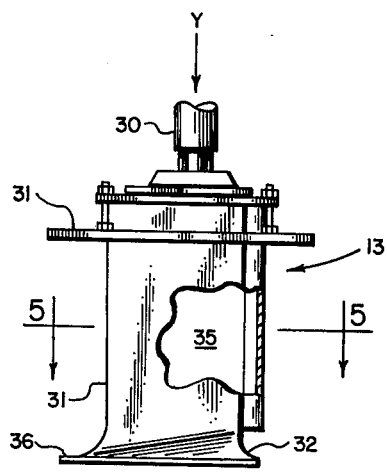
FIG. 4 is a partially cutaway side view of a plow-like member which is a key element of the invention.
Figure 5:
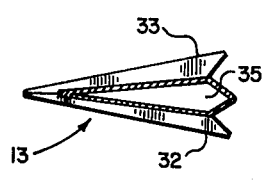
FIG. 5 is a cross-sectional view taken along the lines 5—5 of FIG. 4.
Figure 6:
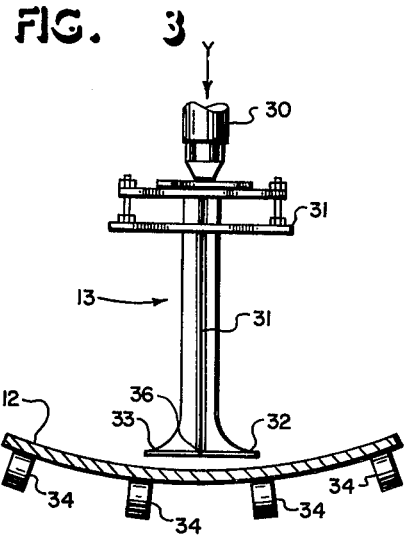
FIG. 6 is a forward view of the plow-like member illustrating its orientation with respect to a conveyor belt with which it cooperatively functions.

More specific structure for the presently preferred embodiment of the plow-like member 13 is shown in FIGS. 4, 5, and 6. The plow-like member 13 is suspended, by support 31 or any other convenient means, over the silo feed belt 12 (not shown in FIGS. 4 and 5) with its lower terminus just clearing the upper surface of the belt 12 which is supported by rollers 34 in a slightly concave configuration in the usual manner as best shown in FIG. 6. Along most of its length, the plow-like member 13 has a narrow V-shaped cross section with a hollow interior 35 which extends throughout its length and is in communication with conduit 30 which receives the coal fines stream "y" as previously described. The lower end of the plow-like member 13 has a forwardly-extending, sharply-pointed extension of the sharp vertical leading edge 31, which pointed leading edge leads rearwardly to outwardly flared side edges 32 and 33.

Figure 7:
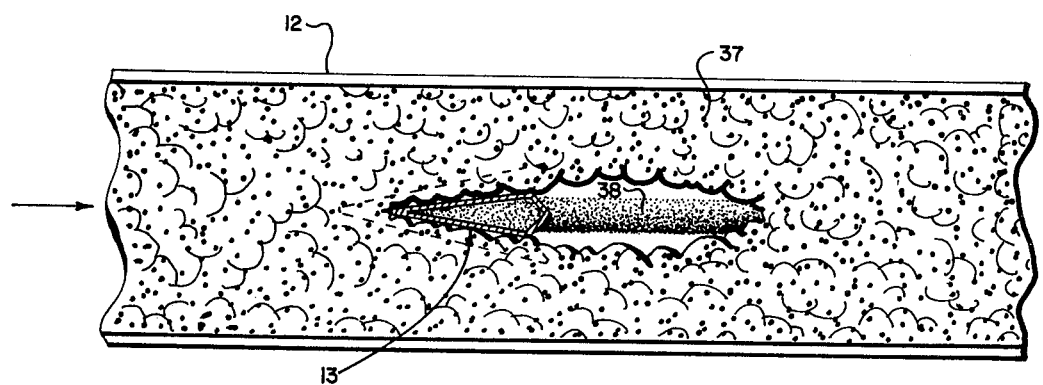
FIG. 7 is a top view of a conveyor belt containing particulate matter and illustrating the manner in which the plow-like member temporarily lifts and folds back a part of the particulate matter stream on the conveyor belt in order to permit insertion of collected fines below the surface.

The operation of the plow-like member 13 in coordination with the other elements of the system are shown in FIG. 7 which illustrates the coal lumps 37 on the silo feed belt 12 being lifted and slightly folded back such that the coal fines 38 may be deposited through the member 13 onto the belt 12. Immediately downstream from the plow-like member 13, the coal lumps 37 fold over the deposited coal fines and hence contain them beneath the coal lump stream for transfer to the silos.

While the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. In a system for handling particulate matter which includes fines subject to undesirable airborne dispersion, which system includes a conveyor belt for transporting the particulate matter, apparatus for containing the fines, and hence limiting the airborne dispersion thereof, which includes:

(A) means for collecting the fines;
   (B) a hollow plow-like member vertically suspended above the conveyor belt with its lower terminus being open and disposed proximate the conveyor belt surface, said plow-like member having a generally narrow V-shaped cross section and being oriented with its leading edge directed to intercept particulate matter carried by the conveyor belt, said plow-like member including outwardly flared side edges extending from said leading edge to effect a slight lifting of the particulate matter in the region of said flared edges; and
   (C) means for introducing collected fines into the hollow interior of said plow-like member;

whereby the plow-like member temporarily folds back the particulate matter to permit insertion of the collected fines thereunder to effect containment thereof.

2. The apparatus of claim 1 wherein said plow-like member includes an opening at the upper terminus thereof for the introduction of collected fines thereto.

* * * * *